(12) United States Patent
Donderici et al.

(10) Patent No.: US 10,656,301 B2
(45) Date of Patent: May 19, 2020

(54) REDUCING EFFECTS OF CONDUCTIVE MUD ON SINGLE-WELL RANGING

(71) Applicant: Halliburton Energy Services, Inc., Houston, TX (US)

(72) Inventors: Burkay Donderici, Houston, TX (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 423 days.

(21) Appl. No.: 15/538,291

(22) PCT Filed: Jun. 20, 2016

(86) PCT No.: PCT/US2016/038410
§ 371 (c)(1),
(2) Date: Jun. 21, 2017

(87) PCT Pub. No.: WO2017/222500
PCT Pub. Date: Dec. 28, 2017

(65) Prior Publication Data
US 2018/0210107 A1    Jul. 26, 2018

(51) Int. Cl.
*G01V 3/20* (2006.01)
*E21B 43/24* (2006.01)
(Continued)

(52) U.S. Cl.
CPC .......... *G01V 3/20* (2013.01); *E21B 43/2406* (2013.01); *E21B 47/02216* (2013.01); *E21B 47/122* (2013.01); *E21B 47/124* (2013.01)

(58) Field of Classification Search
CPC . G01V 3/20; E21B 43/2406; E21B 47/02216; E21B 47/122; E21B 47/124
See application file for complete search history.

(56) References Cited

U.S. PATENT DOCUMENTS 5,064,006 A * 11/1991 Waters .................... E21B 7/068
175/45
5,084,678 A * 1/1992 Hutin ...................... G01V 3/26
175/45

(Continued)

FOREIGN PATENT DOCUMENTS

| WO | 2014/089402 A2 | 6/2014 |
| WO | WO2014089402 * | 6/2014 |
| WO | 2016/057241 A1 | 4/2016 |

OTHER PUBLICATIONS

Doll, H. G. "The laterolog: A new resistivity logging method with electrodes using an automatic focusing system." Journal of Petroleum Technology 3.11 (1951): 305-316.

(Continued)

*Primary Examiner* — Regis J Betsch
(74) *Attorney, Agent, or Firm* — Jason Sedano; Baker Botts L.L.P.

(57) ABSTRACT

An example downhole tool for determining ranging parameters involves placing a guard electrode between a survey electrode and a return electrode where the survey electrode and the return electrode are separated by a gap subs. A fixed, predictable, and stable path for the survey current is formed that is independent of the conductivity of the mud or conductive targets resulting in a formation current that may be used to estimate the direction, orientation or distance of a conductive target. The formation current is then a stable current that excites a conductive target in the same way regardless of the conductivity of the mud so as to obtain a mud-independent reference signal in single-well ranging.

20 Claims, 7 Drawing Sheets

(51) Int. Cl.
*E21B 47/022* (2012.01)
*E21B 47/12* (2012.01)

(56) References Cited

U.S. PATENT DOCUMENTS

| | | | |
|---|---|---|---|
| 7,962,287 B2 | 6/2011 | Clark | |
| 8,844,648 B2 | 9/2014 | Bittar et al. | |
| 2009/0030615 A1* | 1/2009 | Clark | E21B 47/02216 702/7 |
| 2011/0114309 A1* | 5/2011 | Bloemenkamp | G01V 3/24 166/250.01 |
| 2011/0308859 A1 | 12/2011 | Bittar et al. | |
| 2014/0069721 A1 | 3/2014 | Clark et al. | |
| 2015/0219783 A1* | 8/2015 | Sitka | E21B 23/06 324/326 |
| 2015/0268371 A1 | 9/2015 | Donderici et al. | |

OTHER PUBLICATIONS

Doll, H. G. "The microlaterolog." Journal of Petroleum Technology 5.01 (1953): 17-32.
Ellis, Darwin V., and Julian M. Singer. Well logging for earth scientists. vol. 692. Dordrecht: Springer, 2007.
International Search Report and Written Opinion issued in related PCT Application No. PCT/US2016/038410 dated Mar. 20, 2017, 19 pages.

* cited by examiner

REDUCING EFFECTS OF CONDUCTIVE MUD ON SINGLE-WELL RANGING

CROSS-REFERENCE TO RELATED APPLICATION

The present application is a U.S. National Stage Application of International Application No. PCT/US2016/038410 filed Jun. 20, 2016, which is incorporated herein by reference in its entirety for all purposes.

BACKGROUND

The present disclosure relates generally to well logging operations and, more particularly, to an improvement in making ranging measurements using a galvanic tool by reducing the effects of conductive mud.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Existing well drilling operations require information on formation characteristics to aid in drilling decisions. Numerous measurement techniques are used, including logging while drilling (LWD), measuring while drilling (MWD), electromagnetic (EM) ranging applications, and wireline. One such measurement technique includes the use of a galvanic tool to take ranging measurements of the surrounding formation. Galvanic tools may include one or more electrodes through which current is injected into and returned from the formation to generate the ranging measurements. During typical operation current should ideally only flow between selected ones of the electrodes. In practice, however, "leakage current" may run through other ones of the electrodes. This may reduce the accuracy of the resulting ranging measurements.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

Throughout this disclosure, a reference numeral followed by an alphabetical character refers to a specific instance of an element and the reference numeral alone refers to the element generically or collectively. Thus, as an example (not shown in the drawings), widget "12a" refers to an instance of a widget class, which may be referred to collectively as widgets "12" and any one of which may be referred to generically as a widget "12". In the figures and the description, like numerals are intended to represent like elements.

DETAILED DESCRIPTION

The present disclosure relates generally to well drilling operations and, more particularly, to obtaining an improved ranging measurement using a galvanic tool.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or local area network (LAN). Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including LWD and MWD, and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

The accuracy of resistivity measurements from galvanic tools may be improved by accounting for and/or minimizing leakage currents between the electrodes of a galvanic tool. As will be described in detail below, galvanic tool leakage currents may be accounted for in the resulting resistivity measurements by isolating the current that flows into the formation from the current excited at an electrode. In certain embodiments, the leakage currents that run through the electrodes of the galvanic tool also are minimized by the introduction of a guard electrode between a gap sub and either of the electrodes of the galvanic tool.

Figure 1:
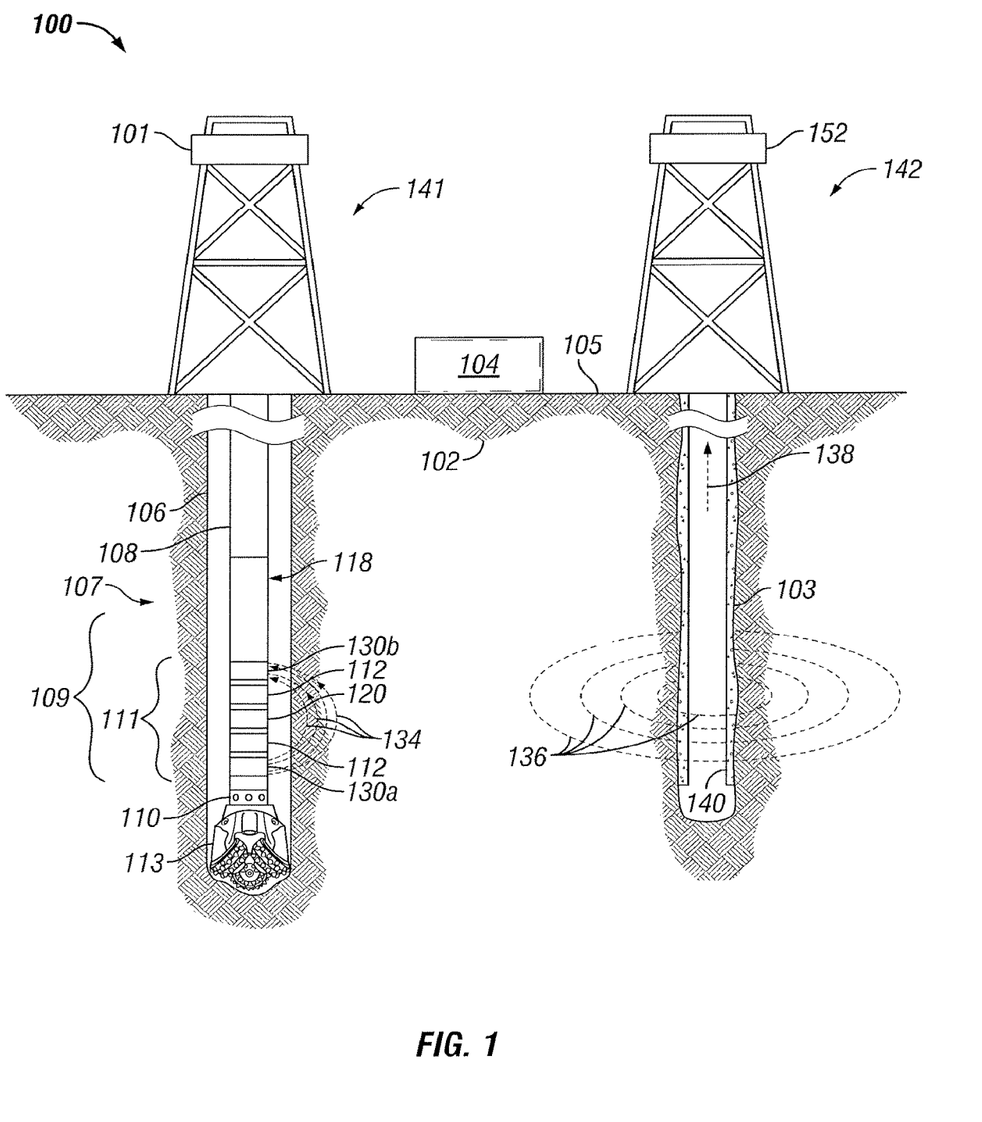
FIG. 1 is a diagram showing an illustrative logging while drilling environment, according to aspects of the present disclosure.

FIG. 1 is a diagram illustrating an example drilling and ranging system environment 100, according to aspects of the present disclosure. The environment 100 includes rig 101 at the surface 105 associated with a well 141 and positioned above borehole 106 within a subterranean formation 102. Rig 101 may be coupled to a drilling assembly 107, comprising drill string 108 and bottom hole assembly (BHA) 109. The BHA 109 may comprise a drill bit 113 and a downhole tool 111. The downhole tool 111 may be any type of downhole tool 111 including, but not limited to, a MWD, an LWD, ranging tool, sensors, a galvanic tool, etc. The downhole tool 111 may include similar functionality as and/or be incorporated in any other component including but not limited to a MWD, LWD, or galvanic tool. In certain embodiments, the drilling assembly 107 may be rotated by a top drive mechanism (not shown) to rotate the drill bit 113 and extend the borehole 106. In certain other embodiments, a downhole motor (not shown), such as a mud motor, may be included to rotate the drill bit 113 and extend the borehole 106 without rotating the drilling assembly 107. Although not depicted, in one or more embodiments, such as in an offshore drilling operation, the surface 105 may be separated from the rig 101 by a volume of water.

As used herein, a galvanic tool may comprise any tool, such as downhole tool 111, with electrodes or a toroidal coil through which current is injected into a subterranean formation and a voltage response of the formation to the injected current is measured. As the bit extends the borehole 106 through the formation 102, the downhole tool 111 may collect resistivity measurements relating to borehole 106, the borehole 103 and the formation 102. In certain embodiments, the orientation and position of the downhole tool 111 may be tracked using, for example, an azimuthal orientation indicator, which may include magnetometers, inclinometers, and/or accelerometers, though other sensor types such as gyroscopes may be used in some embodiments.

One or more ranging operations may require that a location of a conductive target be identified. In the embodiment shown, the conductive target comprises a target well 142 for a second borehole 103 associated with a rig 152. The borehole 103 may comprise a casing 140 containing or composed of an electrically conductive member such as casing, liner or a drill string or any portion thereof that has had a blowout or that needs to be intersected, followed, tracked or avoided. In the embodiment shown, the borehole 103 includes an electrically conductive casing 140. Identifying the location of the target well 142 with conductive casing 140 may comprise taking various measurements and determining a distance, direction or orientation of the target well 142.

In certain embodiments, performing ranging measurements may include inducing an electromagnetic (EM) field within the second borehole 103 based, at least in part, on a formation current 134 injected into the formation 102. In the embodiment shown, inducing a magnetic field within the borehole 103 comprises injecting a formation current 134 by exciting a survey electrode 130a to induce current to flow into the formation 102 and return at return electrode 130b. The source of the excitation may be a voltage or a current. Electrodes 130 may be components of the downhole tool 111, BHA 109, or any other downhole tool or component. Formation current 134 may be induced within the formation 102 by energizing the survey electrode 130a of the drilling assembly 107 according to a control signal that specifies signal characteristics for the formation current 134. The formation current 134 may comprise, for example, an alternating current electrical signal. The transmit electrode 130a may be a button, a cylindrical or semi-cylindrical sheet electrode, or an electrode of any other type that has a metallic surface in contact with or in very close proximity of the borehole wall 106. Part of the formation current 134 may be received and concentrated at the casing 140 within the conductive target (target well 142), shown as current 138, and the current 138 on the casing 140 may induce a magnetic field 136 in a radial direction from the direction of the flow of the current 138. A magnetic field 136 created by the conductive target or casing 140 may be proportional to the current flowing into the formation.

The drilling assembly 107 or the downhole tool 111 may include a gap sub 112 that may allow for a dipole electric field to be created to aid in flowing or drawing current into the formation 102. In any embodiment, the survey electrode 130a may be located on the order of 10-200 feet from the return electrode 130b or at any range greater, lesser, or in between. A guard electrode 120 may be placed between the survey electrode 130a and the return electrode 130b to further isolate the current flowing into the formation 102.

In certain embodiments, a system control unit 104 may be positioned at the surface 105 as depicted in FIG. 1 and may be communicably or communicatively coupled to downhole elements including, but not limited to, drilling assembly 107, telemetry system 118, downhole tool 111, and BHA 109. In other embodiments, a system control unit 104 may be positioned below the surface 105 (not shown) and may communicate data to another system control unit 104 or any other system, for example, an information handling system, capable of receiving data from the system control unit 104. For example, the system control unit 104 may be communicably coupled to the MWD apparatus 111, electrodes 130, drill bit 113, or any other component through a telemetry system 118. The telemetry system 118 may be incorporated into the BHA 109 or any other downhole tool or component of drilling assembly 107 and may comprise a mud pulse type telemetry system that transmits information between the surface system control unit 104 and downhole elements via pressure pulses in drilling mud. Although the system control unit 104 is positioned at the surface 105 in FIG. 1, certain processing, memory, and control elements may be positioned within the drilling assembly 107. Additionally, various other communication schemes may be used to transmit communications to/from the system control unit 104, including wireline configurations and wireless configurations.

In certain embodiments, the system control unit 104 may comprise an information handling system with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The formation current 134 may be injected into the formation 102 by excitation of the survey electrode 130a. In certain embodiments, the system control unit 104 may excite the survey electrode 130a by sending a command downhole to the downhole tool 111 or a controller (not shown) associated with the downhole tool 111. The command(s) may cause the downhole tool 111 to excite the survey electrode 130a. In other embodiments, the survey electrode 130a is excited by a downhole source located at or associated with the downhole tool 111. In one or more embodiments the source of excitation may be located downhole or at the surface 105.

In certain embodiments, the signal characteristics of the formation current 134 may be based at least in part on at least one downhole characteristics within the borehole 106 and formation 102, including a noise level within the formation 102; a frequency transfer function of the survey electrode 130a, the return electrode 130b, the formation 102; and a frequency response of the conductive target. The noise level within the formation 102 may be measured downhole using electromagnetic or acoustic receivers coupled to the drilling assembly, for example. The frequency transfer function and the frequency response of the target borehole 103 may be determined based on various mathematical models, or may be extrapolated from previous ranging measurements.

In certain embodiments, the system control unit 104 may further send commands to a receiver, for example, receiver 110, to cause any one or more receivers 110 to measure the induced magnetic field 136 on the second borehole 103. The receiver 110 may be a magnetometer, a collection of magnetometers, a solenoidal coil wrapped around the downhole tool 111 (for example, with a tilt between 0 degrees and 45 degrees), a solenoidal coil placed on the side of the downhole tool 111, or a collection of solenoidal coils. Like the survey electrode 130a, the receiver 110 may be coupled to a downhole controller, and the commands from the system control unit 104 may control, for example, when the measurements are taken. In certain embodiments, the system control unit 104 may determine and set a sampling rate of the induced magnetic field 136, as will be described below. Additionally, measurements taken by the receiver 110 may be transmitted to the system control unit 104 via the telemetry system 118. The control unit 104 may determine a distance, orientation and direction to the conductive target (for example, target well 142 or casing 140 of borehole 103) in the embodiment shown, based at least in part on the measurement of the induced magnetic field 136. For example, the system control unit 104 may use geometric algorithms to determine the distance, orientation and direction of the second borehole 103 relative to the borehole 106.

Figure 2:
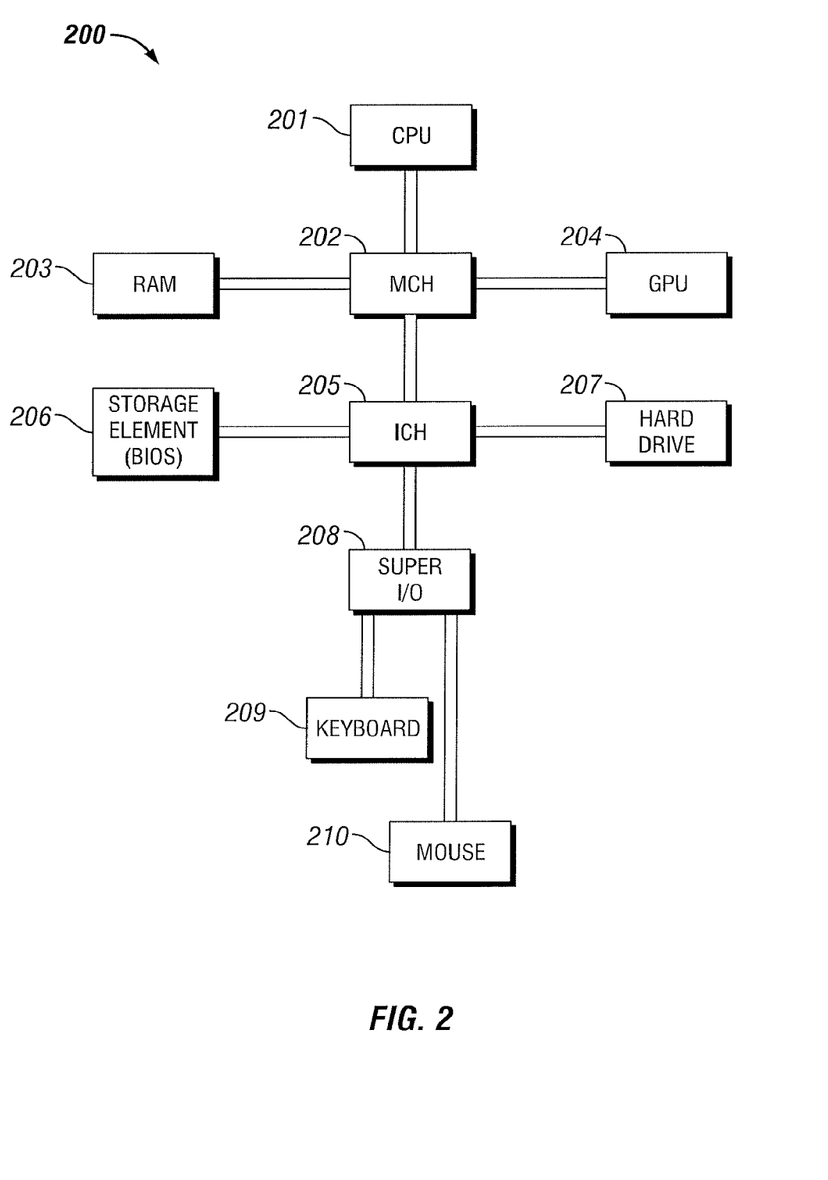
FIG. 2 is a diagram of an example information handling system, according to aspects of the present disclosure.

FIG. 2 is a diagram illustrating an example information handling system 200, according to aspects of the present disclosure. The system control unit 104 may take a form similar to the information handling system 200. A processor or central processing unit (CPU) 201 of the information handling system 200 is communicatively coupled to a memory controller hub or north bridge 202. The processor 201 may include, for example a microprocessor, microcontroller, digital signal processor (DSP), application specific integrated circuit (ASIC), or any other digital or analog circuitry configured to interpret and/or execute program instructions and/or process data. Processor 201 may be configured to interpret and/or execute program instructions or other data retrieved and stored in any memory such as memory 203 or hard drive 207. Program instructions or other data may constitute portions of a software or application for carrying out one or more methods described herein. Memory 203 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from a software or application may be retrieved and stored in memory 203 for execution by processor 201.

Modifications, additions, or omissions may be made to FIG. 2 without departing from the scope of the present disclosure. For example, FIG. 2 shows a particular configuration of components of information handling system 200. However, any suitable configurations of components may be used. For example, components of information handling system 200 may be implemented either as physical or logical components. Furthermore, in some embodiments, functionality associated with components of information handling system 200 may be implemented in special purpose circuits or components. In other embodiments, functionality associated with components of information handling system 200 may be implemented in configurable general purpose circuit or components. For example, components of information handling system 200 may be implemented by configured computer program instructions.

Memory controller hub 202 may include a memory controller for directing information to or from various system memory components within the information handling system 200, such as memory 203, storage element 206, and hard drive 207. The memory controller hub 202 may be coupled to memory 203 and a graphics processing unit 204. Memory controller hub 202 may also be coupled to an I/O controller hub or south bridge 205. I/O hub 205 is coupled to storage elements of the information handling system 200, including a storage element 206, which may comprise a flash ROM that includes a basic input/output system (BIOS) of the computer system. I/O hub 205 is also coupled to the hard drive 207 of the information handling system 200. I/O hub 205 may also be coupled to a Super I/O chip 208, which is itself coupled to several of the I/O ports of the computer system, including keyboard 209 and mouse 210.

In certain embodiments, determining the distance, orientation and direction of a conductive target, for example, a second borehole 103, relative to the borehole 106 may be accomplished using the magnetic fields received by the receiver 110. In certain embodiments, the distance and direction determination may be achieved utilizing the relationship in Equation (1) between the casing current and the received magnetic fields.

$$\overline{H} = \frac{I}{2\pi r}\hat{\phi} \quad \text{Equation (1)}$$

where H is the magnetic field vector, I is the current on the casing 140 (or a target pipe), r is the shortest distance between the receiver 110 and the casing 140; and φ is a vector that is perpendicular to both the z-axis of the receiver 110 and the shortest vector that connects the casing 140 to the receiver 110. Although Equation (1) assumes constant casing current along the casing 140, it can be extended to any current distribution by using the appropriate model.

In certain embodiments, the distance and direction of the second borehole 103 relative to the first borehole 106 may be determined using Equations (2) and (3), respectively.

$$r = \frac{I}{2\pi|\overline{H}|} \text{ and} \quad \text{Equation (2)}$$

$$\Phi = \text{angle}(\hat{x}\cdot\overline{H}, \hat{y}\cdot\overline{H}) + 90, \quad \text{Equation (3)}$$

where "·" is the vector inner-product operation. In certain instances, however, Equation (2) may be unreliable if a direct or accurate measurement of I is not possible.

When a direct or accurate measurement of I is difficult or impossible, magnetic field gradient measurement may be utilized for the direction and distance determinations. Spatial change in the magnetic field may be measured in a direction that has a substantial component in the radial (r-axis) direction as in Equation (4). For the gradient approach to work, the receiver 110 should be a collection of magnetometers or a collection of solenoidal coils.

$$\frac{\partial \overline{H}}{\partial r} = -\frac{I}{2\pi r^2}\hat{\phi}, \quad \text{Equation (4)}$$

where ∂ is the partial derivative. With this gradient measurement available in addition to an absolute measurement, the distance to the second borehole 103 may be calculated using Equation (5).

$$r = \frac{|\overline{H}|}{\left|\frac{\partial \overline{H}}{\partial r}\right|} \quad \text{Equation (5)}$$

Figure 3:
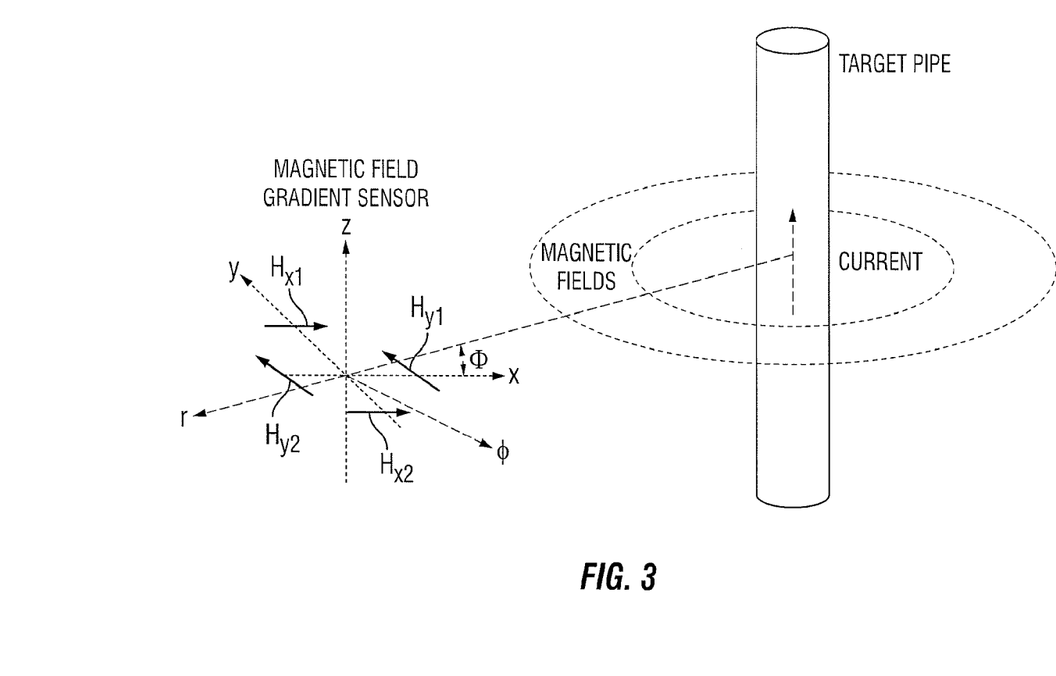
FIG. 3 is a diagram illustrating example gradient measurement components in relation to a target object and the magnetic fields produced by currents on the target object.

In certain embodiments, the gradient field in Equation (5) may be realized in practice by utilizing finite difference of two magnetic field dipole measurements as shown below in Equation (6):

$$r = \frac{H_y}{\frac{H_y\left(x+\frac{\Delta x}{2}, y\right) - H_y\left(x-\frac{\Delta x}{2}, y\right)}{\Delta x}}, \quad \text{Equation (6)}$$

where $H_y$ and the gradient measurement components are illustrated in the 4-dipole configuration of FIG. 3 in relation to a target casing 140 and the magnetic fields produced by currents on the casing 140.

Figure 4A:
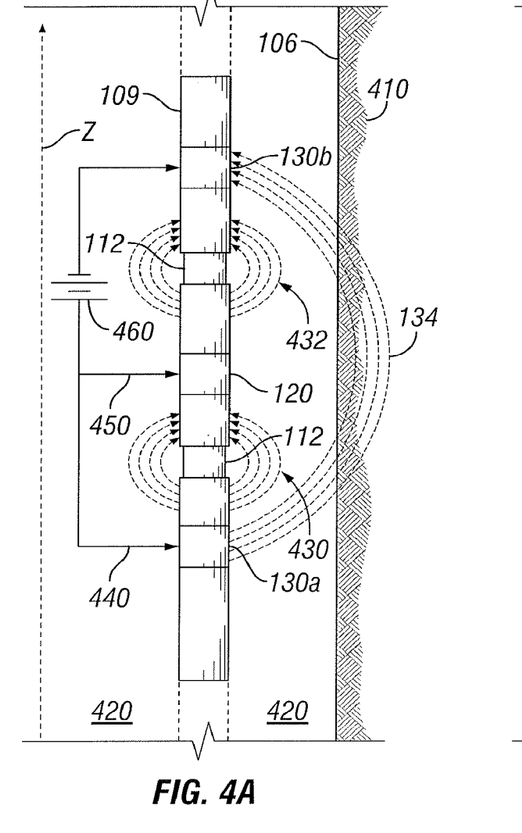
FIGS. 4A, 4B, and 4C are diagrams illustrating a cross-sectional view of a downhole system for galvanic excitation, according to aspects of the present disclosure.
Figure 4B:
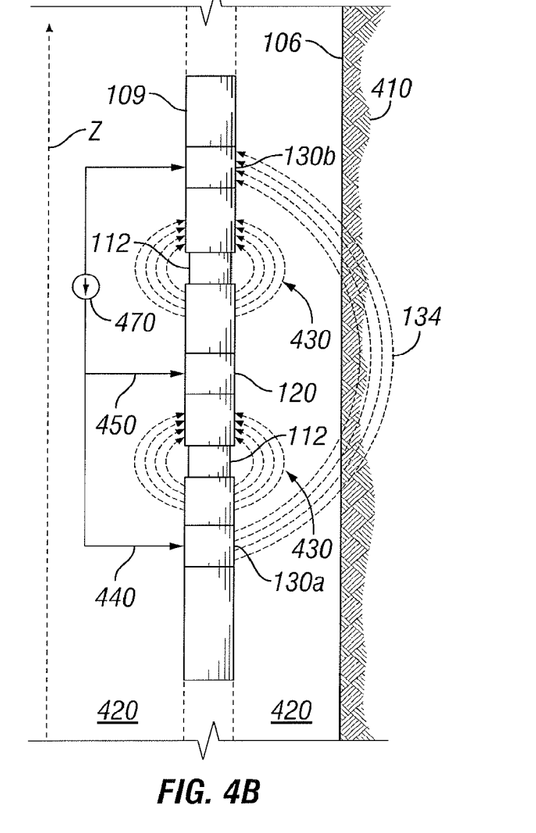
Figure 4C:
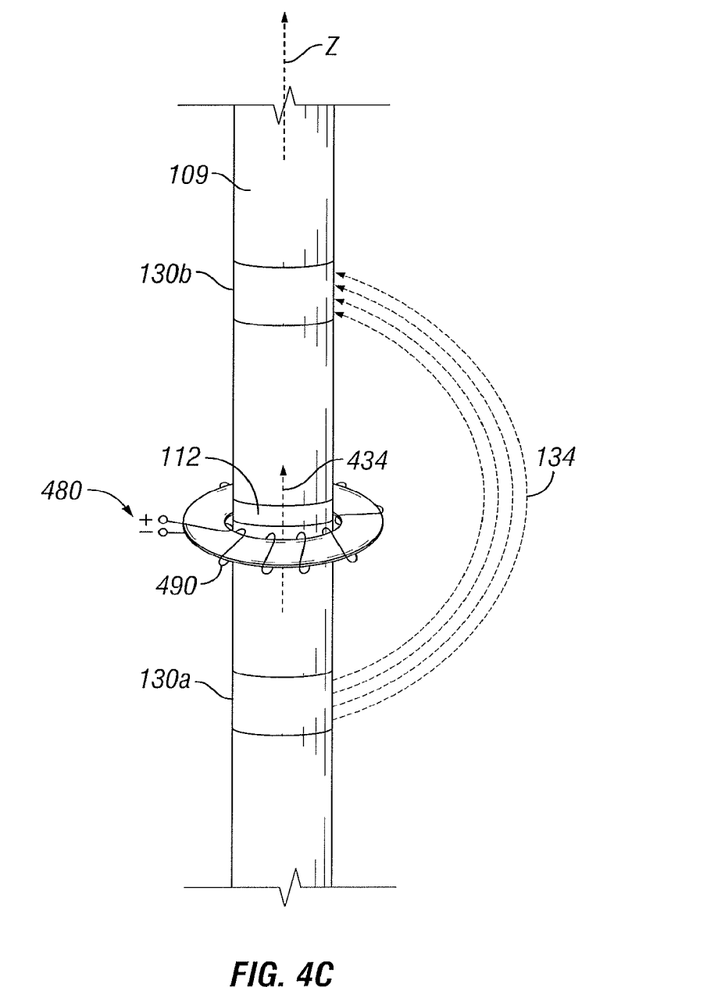

FIG. 4A, FIG. 4B, and FIG. 4C are cross-sections of example downhole systems for galvanic excitation. For purposes of this disclosure, the term BHA 109 will be used with the understanding that this term includes any other suitable downhole component of drilling assembly 107. While BHA 109 is shown, the components may be included as part of any component of the drilling assembly 107, for example, as downhole tool 111. Discussion regarding the BHA 109 may apply to any suitable downhole component. In particular embodiments, the geometry of the BHA 109 is cylindrically symmetric around the z axis and as such only the yz cross-section is illustrated. BHA 109 is disposed within borehole 106 where mud 420 flows between BHA 109 and a wall of the borehole 106. The total axial length of the BHA 109 may be orders of magnitude greater than the relative distances between the electrodes 130. The BHA 109 comprises at least two electrodes 130 (at least one survey electrode 130a and at least one return electrode 130b). The electrodes 130 may be located at any position along the BHA 109 and the orientation may be reversed, for example, survey electrode 130a may be located closer to the surface 105. The electrodes 130 may be direct contact with the body of the BHA 109. The BHA 109 may be metallic, with negligible resistivity compared to that of the mud 420 and the formation 102.

A gap sub 112 is located between the electrodes 130 (for example, survey electrode 130a and return electrode 130b to electrically insulate two portions of the BHA 109 and to prevent shorting. The gap sub 112 may comprise insulating materials. As a result of excitation of the survey electrode 130a, a formation current 134 (Iform) flows through the formation 102 and reaches the return electrode 130b. As the mud 420 is typically present outside and/or inside the BHA 109, some current may cross a gap sub through the mud 420. A gap current provides no information regarding the conductive target (for example, target well 142) as a gap current does not flow into the formation 102. In some circumstances, a gap current may constitute a large portion of the total current (for example, survey current 440 (Isurvey)) delivered to the survey electrode 130a. As a gap current (such as return gap current (Igap1) 432, survey gap current 430 (Igap2), and toroidal gap current 434 (Igap3)) is not relevant to a determination of the distance, orientation or direction to a conductive target (for example, target well 142), more informative measurements may be acquired by subtracting gap currents from the survey current 440 prior to post-processing and inversion.

In particular embodiments, Igap1 432 and Igap2 430 are isolated by locating a guard electrode 120 between the survey electrode 130a and the return electrode 130b. The guard electrode 120 and the survey electrode 130a may be kept at the same potential by a source (for example, voltage source 460 and current source 470 in FIG. 4A and FIG. 4B, respectively). If the mud 420 is conductive, the guard current 450 may be essentially (or estimated to be) Igap1 432 and the survey current 440 may be essentially (or estimated to be) the formation current 134. As the guard electrode 120 is kept at the same potential as the survey electrode 130a, Igap2 430 approaches zero. As a result, the survey current 440 flows radially outward into the formation 102 as formation current 134, regardless of the resistivity of the mud 420. Igap1 432 may be measured at a much greater value than zero when the mud 420 is conductive making the guard current 450 highly dependent on the resistivity of the mud 420. Since the survey current 440 is independent of the mud resistivity, the survey current 440 may be used as a normalization reference, resulting in the post-processing becoming independent of the mud resistivity as well. This normalization procedure of the present disclosure is discussed below with respect to the received signal F.

In FIG. 4C, a toroidal coil 490 is located along the BHA 109. The toroidal coil 490 is excited by a toroidal source 480. Igap3 434 is directly measured using the toroidal coil 490 and removed from the induced total current to yield a formation current 134. The Igap3 434 is measured using the toroidal coil 490 wrapped around the gap sub 112. The gap sub 112 and the toroidal coil 490 may be located anywhere along or within a groove of the BHA 109. The toroidal coil 490 may be located at, above or below the gap sub 112. In this way, the formation current 134 is isolated from the total current.

In particular embodiments, the survey electrode 130a, the return electrode 130b, and the guard electrode 120 are in direct electrical contact with the BHA 109 such that three elongated electrodes separated by two gap subs are essentially created. The sizes of the electrodes 130, the guard electrode 120 and the gap subs 112 as well as the distances between any one or more of them may be application specific. For example, the spacing between the survey electrode 130a and the return electrode 130b may be chosen to correspond to a value comparable to the desired depth of investigation of a ranging tool, for example, downhole tool 111. Depending on the ranging application (for example, well avoidance, well intervention, steam-assisted gravity drainage (SAGD)), the spacing may range from 2 meters to 100 meters.

In particular embodiments, the formation current 134 flows through a nearby conductive target such as conductive casing 140 of target well 142. The conductive target creates a secondary signal F (for example, magnetic field 136) somewhere in the downhole tool 111. This secondary signal F may be a current, a voltage, an electric field, or a magnetic field measured by a sensor on the downhole tool 111. To normalize F requires a reference signal which represents the strength of the excitation. The reference signal may be survey current 440 as it flows into the formation 102 and not across a gap sub 112. Using a total current (survey current 440 combined with guard current 450) increases complexity as the guard current 450 is sensitive to the resistivity of mud 420 which also introduces error into the inversion due to the possibility of an inaccurate mud resistivity.

Figure 5:
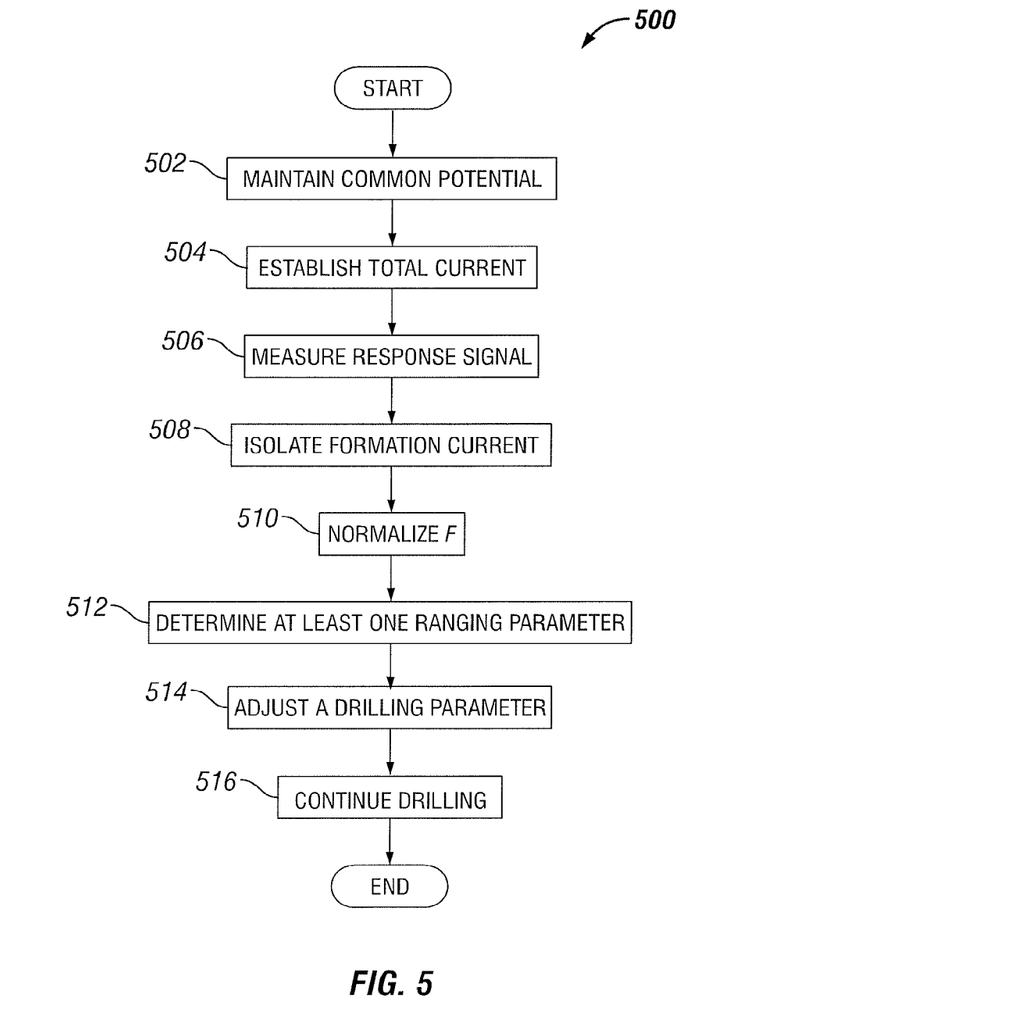
FIG. 5 is a flow diagram of an example ranging method, according to aspects of the present disclosure.

FIG. 5 is a flow diagram of an example ranging method, according to aspects of the present disclosure. The ranging method of FIG. 5 may be implemented using any number of configurations for a downhole tool 111, for example, the BHA 109 of FIGS. 4A and 4B. At step 502, a common potential (or a common voltage) is maintained at guard electrode 120 and a survey electrode 130a by a source as illustrated in FIGS. 4A and 4B. The common potential may be provided by a voltage source 460 or a current source 470. The common potential may be maintained by direct shorting or by adjusting the guard current 450 using feedback circuitry.

At step 504, a total current is established by the source (the guard electrode 120 and the survey electrode 130a are excited). The total current includes the guard current 450 and the survey current 440. At step 506 a response signal F from the conductive target is measured or determined. The response signal F may be measured by measuring a voltage, a current, a magnetic field (for example, magnetic field 136), an electromagnetic field, or any other characteristic associated with the response signal F. At step 508, the formation current 134 is isolated from the total current.

Figure 7:
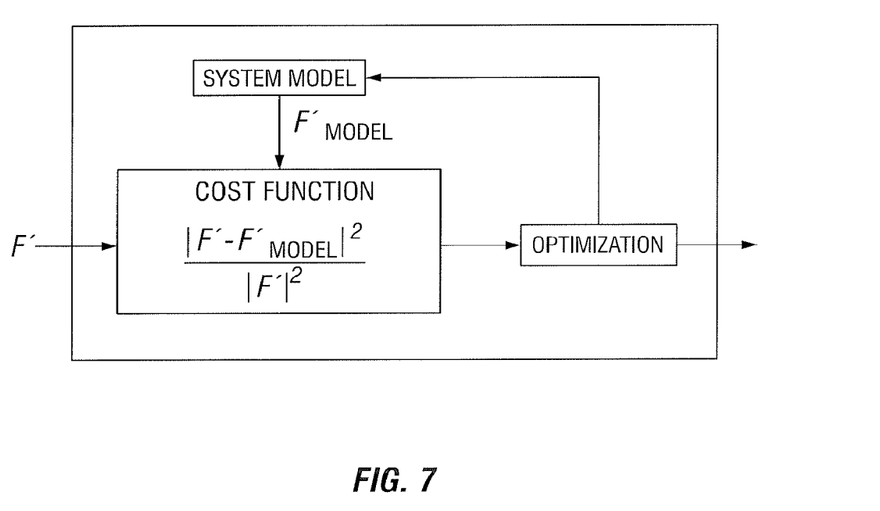
FIG. 7 is a diagram illustrating an inversion model, according to aspects of the present disclosure.

At step 510, the response signal F received from the conductive target associated with the formation current 134 as determined at step 506 is normalized to obtain a normalized response F'. The normalized response F' may be determined by the ratio of the unnormalized response F and the survey current 440 (Isurvey), for example, F'=F/Isurvey. As mentioned above, F' is independent of the resistivity of the mud 420. At step 512, one or more ranging parameters are determining based, at least in part, on the normalized response F' and the survey current 450. For example, the one or more ranging parameters may be determined based on an inversion algorithm employing a system model. A block diagram for the inversion algorithm is illustrated by FIG. 7. The one or more ranging parameters may include, but are not limited to, a direction α, orientation θ, and distance D of a conductive target. These parameters are found by an optimization (or inversion) algorithm that adjusts a system model until the system model output F'$_{model}$ matches the measured output F'. A cost function is defined as a normalized difference between F'$_{model}$ and F', which is minimized by the inversion algorithm. The inversion algorithm is usually implemented as a successive iteration that seeks optimal model parameters (α,θ,D) by computing the gradients of the cost function with respect to each model parameter.

If the mud 420 is conductive, F' is essentially independent of the resistivity of the mud. As a result, an inversion algorithm also becomes independent of the mud resistivity. This considerably simplifies the inversion process, as the system model (that which produces the system model output F'$_{model}$) no longer needs to account for the mud resistivity. In other words, the system model output F'$_{model}$ will be the same regardless of the mud resistivity.

At step 514, one or more drilling parameters are adjusted based, at least in part, on the determined one or more ranging parameters. The one or more drilling parameters may include, but are not limited to, depth, drilling rate, rotation, torque, thrust pressure, retaining pressure, injection fluid flow rate and pressure, X and Y inclination, and reflected vibration. At step 516, drilling at the borehole 106 continues based, at least in part, on the one or more adjusted drilling parameters. The method continues from step 516 to step 506 until completion of the drilling operation or may end at any step or at any number of iterations.

Figure 6:
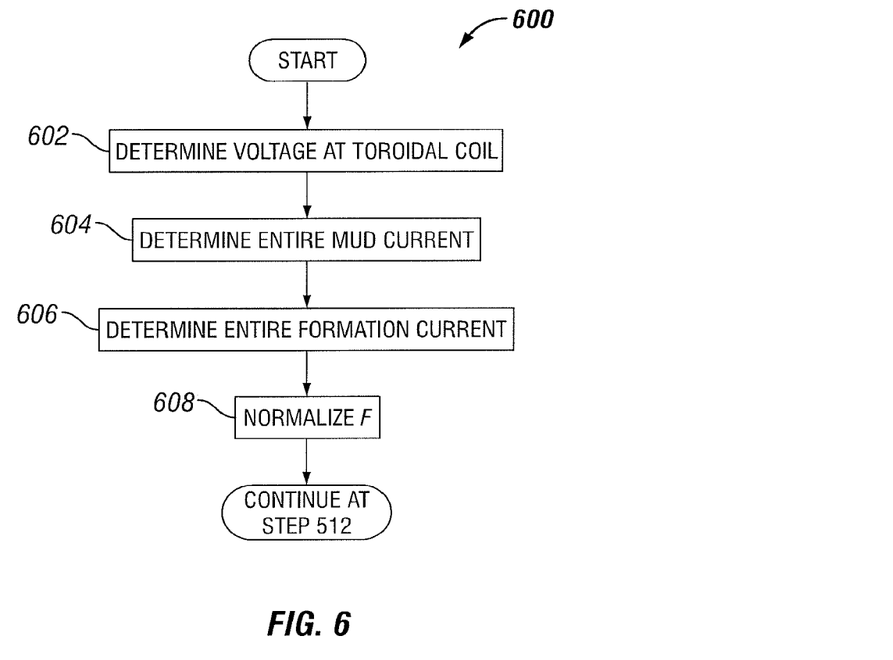
FIG. 6 is a flow diagram of an example ranging method, according to aspects of the present disclosure.

FIG. 6 is a flow diagram of an example ranging method, according to aspects of the present disclosure. The ranging method of FIG. 6 may be implemented using any number of configurations for a downhole tool 111, for example, the BHA 109 of FIG. 4C. FIG. 6 begins after the steps 502, 504 and 506 as the method of FIG. 6 requires a toroidal coil 490. At step 602, the voltage on the toroidal coil 480 (Vtoroid) is determined so as to determine a mud current flowing through the toroidal coil 490 (Igap, int). For example, Igap, int may be determined as shown in Equation (7) where r is the radius of the toroid from the BHA 109 axis, N is the number of turns for the toroidal coil 490 and A is the tube area for the toroidal coil 490, μ is the permeability of the toroidal core, and ω is the frequency.

$$Igap, int = \frac{2\pi r}{j\omega \mu NA} Vtoroid \quad \text{Equation (7)}$$

At step 604, the entire mud current 434 (Igap) is determined by scaling according to a cross-sectional area of mud flow. For example, the Igap 434 may be determined as shown in Equation (8) where A$_{total}$ is the cross-sectional area of mud flow or the total cross-sectional area of the borehole minus the total cross-sectional area of the body of the BHA 109 and A$_{int}$ is the cross-sectional area of the inside of the BHA 109.

$$Igap = Igap, int\left(\frac{A_{total}}{A_{int}}\right) \quad \text{Equation (8)}$$

At step 606, the formation current 134 is determined by removing from the total current the Igap 434. At step 608, the measured response signal F received from the conductive target associated with the formation current 134 as determined at step 506 is normalized to obtain a normalized response F'. The normalized response F' may be determined by the ratio of the normalized response F and the formation current 134 as determined at step 606. The method continues at step 512 as illustrated in FIG. 5.

Any step of FIG. 5 or FIG. 6 may be implemented at any interval time and may occur based, at least in part, on a trigger, occurrence of a condition, a semaphore, an interrupt, according to any other set criteria or any combination thereof. In particular embodiments, the steps of FIG. 5 or FIG. 6 may occur less frequently when a conductive target is determined to be a distance, orientation, direction, or any combination thereof beyond a predefined threshold and may occur more frequently when the conductive target is determined to be a distance, orientation, direction, or any combination thereof within a predetermined threshold. In particular embodiments, the steps of FIG. 5 or FIG. 6 may occur at predetermined time intervals, random time intervals, variable time intervals, user-adjusted time intervals, or any other time interval suitable for a particular environment or operation.

When deployed downhole within a formation 102, any measurements, calculations determination or other information collection or generated at the downhole tool 111 may then be stored at the downhole tool 111 for later retrieval and processing, or transmitted to a remote information handling system (for example, system control unit 104), such as an information handling system communicably coupled to the downhole tool 111 through a wireline, for processing in real-time or near real time.

In certain embodiments, an information handling system 200 or a processor 201 may receive at least one of current, voltage, ranging parameters and resistivity measurements from the downhole tool 111 positioned within a borehole 106. The information handling system 200 may be positioned downhole, such as in the downhole tool 111, or at the surface 105 (for example, as system control unit 104).

Any one or more of the aspects of this disclosure provide reducing the effects of mud resistivity on single-well ranging and the interpretation of the received signal F is made easier by removing the effect of conductive mud from the reference current. Any particular embodiment may be well-suited for use of water-based mud in single-well ranging system with electrode excitation, in galvanic ranging, in magnetic ranging and in other ranging scenarios including, but not limited to, well-interception, well-avoidance, and SAGD.

In one or more embodiments a method for downhole ranging within a formation comprises exciting from a source a total current between a survey electrode and a return electrode within a borehole of the formation, wherein the total current comprises a survey current from the source to the survey electrode, and wherein the survey current flows from the survey electrode to the formation, and isolating a formation current from the total current flowing from the survey electrode to the return electrode, wherein the formation current is based, at least in part, on a resistivity of the formation and the survey current, and determining at least one of one or more ranging parameters of a conductive target based, at least in part, on the isolated formation current, wherein the at least one of the one or more ranging parameters of the conductive target comprises at least one of distance, orientation, and direction of the conductive target within the formation; and adjusting a drilling operation based, at least in part, on the determined at least one of the one or more ranging parameters of the conductive target.

In one or more embodiments the method for downhole ranging within a formation further comprises measuring a receive signal at a receiver, wherein the receive signal is associated with the conductive target, and normalizing the receive signal, wherein the adjusting the drilling operation is based, at least in part, on a ranging model that comprises the at least one of the one or more ranging parameters. In one or more embodiments the method for downhole ranging within a formation further comprises maintaining a common voltage at a guard electrode and the survey electrode, and determining a gap current, wherein the gap current flows from the guard electrode to the return electrode, and wherein the guard electrode is located between the survey electrode and the return electrode, wherein isolating the formation current is based, at least in part, on the gap current and the survey current. In one or more embodiments the method for downhole ranging within a formation further comprises isolating the survey current and a guard current via a first gap sub, wherein the first gap sub is located between the survey electrode and the guard electrode, and wherein the guard current flows from the source to the guard electrode. In one or more embodiments the method for downhole ranging within a formation further comprises isolating the return electrode via a second gap sub between the guard electrode and the return electrode, wherein the second gap sub prevents current from flowing through the tool from the guard electrode to the return electrode. In one or more embodiments the method for downhole ranging within a formation further comprises maintaining a potential at the guard electrode and the survey electrode via a feedback loop and adjusting the guard current based, at least in part, on the feedback loop.

In one or more embodiments the method for downhole ranging within a formation further comprises isolating the survey electrode from the return electrode via a gap sub between the survey electrode and the return electrode, and determining a gap current via a toroidal coil wrapped around the gap sub, wherein the gap current flows through a mud inside an assembly from the survey electrode through the gap sub to the return electrode, wherein the gap sub is located between the survey electrode and the return electrode, and wherein the tool is within the assembly, and scaling the gap current, and determining a formation current based, at least in part, on the total current and the gap current, wherein normalizing the received signal is based, at least in part, on the formation current, and wherein determining the at least one of the one or more parameters of the conductive target is based, at least in part, on the normalized received signal. In one or more embodiments the method for downhole ranging within a formation further comprises wherein scaling the gap current is based, at least in part, on a ratio of a total cross-sectional area of mud flow within the borehole to a cross-sectional area of an inside of the assembly. In one or more embodiments the method for downhole ranging within a formation further comprises wherein the adjusting the drilling operation is based, at least in part, on a model, wherein the model is independent of mud resistivity.

In one or more embodiments, a wellbore drilling system for drilling in a subsurface earth formation, comprises a ranging tool coupled to a drill string, and a survey electrode coupled to the ranging tool, and a return electrode coupled to the ranging tool, and an information handling system communicably coupled to the ranging tool, the information handling system comprises a processor and memory device coupled to the processor, the memory device containing a set of instruction that, when executed by the processor, cause the processor to excite from a source a total current between the survey electrode and the return electrode within a borehole of the earth formation, wherein the total current comprises a survey current from the source to the survey electrode, and wherein the survey current flows from the survey electrode to the formation, and isolate a formation current from the total current flowing from the survey electrode to the return electrode, wherein the formation current is based, at least in part, on a resistivity of the formation and the survey current, and determine at least one of one or more ranging parameters of a conductive target based, at least in part, on the isolated formation current, wherein the at least one of the one or more ranging parameters of the conductive target comprises at least one of distance, orientation, and direction of the conductive target within the formation, and adjust a drilling operation of the wellbore drilling system based, at least in part, on the determined at least one parameter of the conductive target.

In one or more embodiments, the wellbore drilling system for drilling in a subsurface earth formation, further comprises a receiver coupled to the ranging tool, and wherein the set of instructions further cause the processor to measure a receive signal at a receiver, wherein the receive signal is associated with the conductive target, and normalize the receive signal, wherein the adjusting the drilling operation is based, at least in part, on a ranging model that comprises the at least one of the one or more ranging parameters. In one or more embodiments, the wellbore drilling system for drilling in a subsurface earth formation further comprises, wherein the guard electrode is located between the survey electrode and the return electrode, and wherein the set of instructions further cause the processor to maintain a common voltage at a guard electrode and the survey electrode, and determine a gap current, wherein the gap current flows from the guard electrode to the return electrode, and wherein isolating the formation current is based, at least in part, on the gap current and the survey current. In one or more embodiments, the wellbore drilling system for drilling in a subsurface earth formation, further comprises a first gap sub located between the survey electrode and the guard electrode, and wherein the set of instructions further cause the processor to isolate the survey current and a guard current via the first gap sub, wherein the guard current flows from the source to the guard electrode.

In one or more embodiments, the wellbore drilling system for drilling in a subsurface earth formation, further comprises, wherein the set of instructions further cause the processor to isolate the return electrode via a second gap sub between the guard electrode and the return electrode, wherein the second gap sub prevents current from flowing through the tool from the guard electrode to the return electrode. In one or more embodiments, the wellbore drilling system for drilling in a subsurface earth formation, further comprises, wherein the set of instructions further cause the processor to maintain a potential at the guard electrode and the survey electrode via a feedback loop, and adjust the guard current based, at least in part, on the feedback loop. In one or more embodiments, the wellbore drilling system for drilling in a subsurface earth formation, further comprises, a gap sub between the survey electrode and the return electrode, and a toroidal coil wrapped around the gap sub, and wherein the set of instructions further cause the processor to isolate the survey electrode from the return electrode via the gap sub between the survey electrode and the return electrode, and determine a gap current via the toroidal coil, wherein the gap current flows through a mud inside an assembly from the survey electrode through the gap sub to the return electrode, wherein the gap sub is located between the survey electrode and the return electrode, and wherein the ranging tool is within the assembly, and scale the gap current, and determine a formation current based, at least in part, on the total current and the gap current, and wherein normalizing the received signal is based, at least in part, on the formation current, and wherein determining the at least one of the one or more parameters of the conductive target is based, at least in part, on the normalized received signal.

In one or more embodiments, the wellbore drilling system for drilling in a subsurface earth formation, further comprises, wherein the set of instructions further cause the processor to when scaling the gap current, to scale the gap current based, at least in part, on a ratio of a total cross-sectional area of mud flow within the borehole to a cross-sectional area of an inside of the assembly. In one or more embodiments, the wellbore drilling system for drilling in a subsurface earth formation, further comprises, wherein the set of instructions further cause the processor to exclude mud resistivity when determining the at least one of the one or more ranging parameters.

In one or more embodiments, A non-transitory computer readable medium storing a program that, when executed, causes a processor to excite from a source a total current between a survey electrode and a return electrode within a borehole of a formation, wherein the total current comprises a survey current from the source to the survey electrode, and wherein the survey current flows from the survey electrode to the formation, and isolate a formation current from the total current flowing from the survey electrode to the return electrode, wherein the formation current is based, at least in part, on a resistivity of the formation and the survey current, and determine at least one of one or more ranging parameters of a conductive target based, at least in part, on the isolated formation current, wherein the at least one of the one or more ranging parameters of the conductive target comprises at least one of distance, orientation, and direction of the conductive target within the formation, and adjust a drilling operation based, at least in part, on the determined at least one or more ranging parameters of the conductive target. In one or more embodiments, the non-transitory computer readable medium further comprises, wherein the program, when executed, causes the processor to measure a receive signal at a receiver, wherein the receive signal is associated with the conductive target, normalize the receive signal, and wherein the adjusting the drilling operation is based, at least in part, on a ranging model that comprises the at least one of the one or more ranging parameters.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for downhole ranging within a formation, the method comprising:
    exciting from a source a total current between a survey electrode at a first location of a tool and a return electrode located at a second location of the tool within a borehole of the formation, wherein the total current comprises a survey current from the source to the survey electrode, and wherein the survey current flows from the survey electrode to the formation;
    isolating a formation current from the total current flowing from the survey electrode to the return electrode, wherein the formation current is based, at least in part, on a resistivity of the formation and the survey current;
    isolating, by a guard electrode located between the survey electrode and the return electrode, a gap current from the total current;
    determining at least one of one or more ranging parameters of a conductive target based, at least in part, on the isolated formation current, wherein the at least one of the one or more ranging parameters of the conductive target comprises at least one of distance, orientation, direction or any combination thereof of the conductive target within the formation; and
    adjusting a drilling operation based, at least in part, on the determined at least one of the one or more ranging parameters of the conductive target.

2. The method of claim 1 further comprising:
    measuring a receive signal at a receiver, wherein the receive signal is associated with the conductive target;
    normalizing the receive signal; and
    wherein the adjusting the drilling operation is based, at least in part, on a ranging model that comprises the at least one of the one or more ranging parameters.

3. The method of claim 2, further comprising:
    isolating the survey electrode from the return electrode via a gap sub between the survey electrode and the return electrode;
    determining a gap current via a toroidal coil wrapped around the gap sub, wherein the gap current flows through a mud inside an assembly from the survey electrode through the gap sub to the return electrode, wherein the gap sub is located between the survey electrode and the return electrode, and wherein the tool is within the assembly;
    scaling the gap current;
    determining a formation current based, at least in part, on the total current and the gap current;
    wherein normalizing the received signal is based, at least in part, on the formation current; and
    wherein determining the at least one of the one or more parameters of the conductive target is based, at least in part, on the normalized received signal.

4. The method of claim 3, further comprising:
    wherein scaling the gap current is based, at least in part, on a ratio of a total cross-sectional area of mud flow within the borehole to a cross-sectional area of an inside of the assembly.

5. The method of claim 1 further comprising:
    maintaining a common voltage at the guard electrode and the survey electrode;

determining the gap current, wherein the gap current flows from the guard electrode to the return electrode, and wherein the guard electrode is located between the survey electrode and the return electrode; and wherein isolating the formation current is based, at least in part, on the gap current and the survey current.

6. The method of claim 5, further comprising:
isolating the survey current and a guard current via a first gap sub, wherein the first gap sub is located between the survey electrode and the guard electrode, and wherein the guard current flows from the source to the guard electrode.

7. The method of claim 5, further comprising:
isolating the return electrode via a second gap sub between the guard electrode and the return electrode, wherein the second gap sub prevents current from flowing through the tool from the guard electrode to the return electrode.

8. The method of claim 5, further comprising:
maintaining a potential at the guard electrode and the survey electrode via a feedback loop; and
adjusting the guard current based, at least in part, on the feedback loop.

9. The method of claim 1, further comprising:
wherein the adjusting the drilling operation is based, at least in part, on a model, wherein the model is independent of mud resistivity.

10. A wellbore drilling system for drilling in a subsurface earth formation, comprising:
a ranging tool coupled to a drill string;
a survey electrode coupled to the ranging tool at a first location;
a return electrode coupled to the ranging tool at a second location; and
an information handling system communicably coupled to the ranging tool, the information handling system comprises a processor and memory device coupled to the processor, the memory device containing a set of instruction that, when executed by the processor, cause the processor to:
excite from a source a total current between the survey electrode and the return electrode within a borehole of the earth formation, wherein the total current comprises a survey current from the source to the survey electrode, and wherein the survey current flows from the survey electrode to the formation;
isolate a formation current from the total current flowing from the survey electrode to the return electrode, wherein the formation current is based, at least in part, on a resistivity of the formation and the survey current;
isolate, by a guard electrode located between the survey electrode and the return electrode, a gap current from the total current;
determine at least one of one or more ranging parameters of a conductive target based, at least in part, on the isolated formation current, wherein the at least one of the one or more ranging parameters of the conductive target comprises at least one of distance, orientation, direction or any combination thereof of the conductive target within the formation; and
adjust a drilling operation of the wellbore drilling system based, at least in part, on the determined at least one parameter of the conductive target.

11. The wellbore drilling system of claim 10, further comprising:
a receiver coupled to the ranging tool; and
wherein the set of instructions further cause the processor to:
measure a receive signal at a receiver, wherein the receive signal is associated with the conductive target;
normalize the receive signal; and
wherein the adjusting the drilling operation is based, at least in part, on a ranging model that comprises the at least one of the one or more ranging parameters.

12. The wellbore drilling system of claim 11 further comprising:
a gap sub between the survey electrode and the return electrode;
a toroidal coil wrapped around the gap sub; and
wherein the set of instructions further cause the processor to:
isolate the survey electrode from the return electrode via the gap sub between the survey electrode and the return electrode;
determine a gap current via the toroidal coil, wherein the gap current flows through a mud inside an assembly from the survey electrode through the gap sub to the return electrode, wherein the gap sub is located between the survey electrode and the return electrode, and wherein the ranging tool is within the assembly;
scale the gap current;
determine a formation current based, at least in part, on the total current and the gap current;
wherein normalizing the received signal is based, at least in part, on the formation current; and
wherein determining the at least one of the one or more parameters of the conductive target is based, at least in part, on the normalized received signal.

13. The wellbore drilling system of claim 12, wherein the set of instructions further cause the processor to:
when scaling the gap current, to scale the gap current based, at least in part, on a ratio of a total cross-sectional area of mud flow within the borehole to a cross-sectional area of an inside of the assembly.

14. The wellbore drilling system of claim 10, wherein the guard electrode is located between the survey electrode and the return electrode, and wherein the set of instructions further cause the processor to:
maintain a common voltage at the guard electrode and the survey electrode;
determine the gap current, wherein the gap current flows from the guard electrode to the return electrode; and
wherein isolating the formation current is based, at least in part, on the gap current and the survey current.

15. The wellbore drilling system of claim 14, further comprising:
a first gap sub located between the survey electrode and the guard electrode; and
wherein the set of instructions further cause the processor to:
isolate the survey current and a guard current via the first gap sub, wherein the guard current flows from the source to the guard electrode.

16. The wellbore drilling system of claim 14, wherein the set of instructions further cause the processor to:
isolate the return electrode via a second gap sub between the guard electrode and the return electrode, wherein the second gap sub prevents current from flowing through the tool from the guard electrode to the return electrode.

17. The wellbore drilling system of claim 14, wherein the set of instructions further cause the processor to:
maintain a potential at the guard electrode and the survey electrode via a feedback loop; and
adjust the guard current based, at least in part, on the feedback loop.

18. The wellbore drilling system of claim 10, wherein the set of instructions further cause the processor to:
exclude mud resistivity when determining the at least one of the one or more ranging parameters.

19. A non-transitory computer readable medium storing a program that, when executed, causes a processor to:
excite from a source a total current between a survey electrode at a first location and a return electrode at a second location within a borehole of a formation, wherein the total current comprises a survey current from the source to the survey electrode, and wherein the survey current flows from the survey electrode to the formation;
isolate a formation current from the total current flowing from the survey electrode to the return electrode, wherein the formation current is based, at least in part, on a resistivity of the formation and the survey current;
isolate, by a guard electrode located between the survey electrode and the return electrode, a gap current from the total current, wherein;
determine at least one of one or more ranging parameters of a conductive target based, at least in part, on the isolated formation current, wherein the at least one of the one or more ranging parameters of the conductive target comprises at least one of distance, orientation, direction or any combination thereof of the conductive target within the formation; and
adjust a drilling operation based, at least in part, on the determined at least one or more ranging parameters of the conductive target.

20. The non-transitory computer readable medium of claim 19, wherein the program, when executed, causes the processor to:
measure a receive signal at a receiver, wherein the receive signal is associated with the conductive target;
normalize the receive signal; and
wherein the adjusting the drilling operation is based, at least in part, on a ranging model that comprises the at least one of the one or more ranging parameters.

* * * * *